3,745,054
HIGH FILLER CONTENT HOT MELT BACKSIZE ADHESIVE COMPOSITIONS
George E. Smedberg, Wilmington, Del., assignor to E. I. du Pont de Nemours and Company, Wilmington, Del.
No Drawing. Filed Oct. 29, 1971, Ser. No. 194,025
Int. Cl. D05c 17/02; C08f 45/52
U.S. Cl. 161—67
11 Claims

ABSTRACT OF THE DISCLOSURE

Compositions suitable for backsizing tufted carpets comprising a blend of an ethylene/vinyl ester copolymer, microcrystalline wax, an aliphatic thermoplastic hydrocarbon resin substantially free of polymerized aromatics, a polymer resin derived from the alkylation of aromatic compounds with dicyclopentadiene, an antioxidant, and about 50–75 weight percent filler. Carpets of improved hand and strike through wherein the above composition is applied as the secondary scrim and/or tuft bonding backsize adhesive.

BACKGROUND OF THE INVENTION

Field of the invention

This invention relates to carpet backsizing, and more particularly, it relates to high filler content hot melt backsize adhesive compositions of ethylene/vinyl ester copolymer base.

Description of the prior art

For many years the production of backsized tufted carpet has been accomplished by an aqueous latex method. This method involves preparing a tufted structure by stitching a primary backing material (primary scrim) with yarn in such a manner as to form on the top surface of the material a pile composed of numerous closely-spaced erect loops of fiber bundles, i.e., tufts of yarn. If desired, the loops can be cut. After forming the tufted structure, the bottom surface thereof is coated with a latex containing a polymer binder such as a styrene-butadiene copolymer and a secondary backing material (secondary scrim) is applied thereto. The structure is then passed through an oven to dry the latex. By such a process, the tufts of yarn and secondary scrim are bonded to the primary scrim. Also, the individual fiber filaments making up the fiber bundle are bonded together at the primary scrim. While such a process for preparing carpets has been satisfactory from the standpoint of performance, the necessity of a drying step is a severe disadvantage from a cost standpoint and limits the production speed.

Recently, however, there has been developed a new approach to the preparation of tufted carpets. It has been found that carpets could be prepared using a hot melt adhesive backsizing composition instead of an aqueous latex. By the use of a hot melt, the necessity of oven drying the carpet is obviated. While such a hot melt method is quite appealing from the standpoint of cost, some difficulties have been encountered in preparing completely satisfactory carpet.

Previous patents, such as U.S. 3,583,936, disclosing hot-melt formulations for carpet finishing taught the use of 30–45 percent by weight filler in the formulation. Due to the characteristics of the other ingredients in the formula the addition of more than 45 percent filler produces a hot melt blend having too high a viscosity.

SUMMARY OF THE INVENTION

According to the present invention there is provided a composition having a softening point of at least about 200° F. comprising (A) about 3–15 weight percent ethylene copolymer having a melt index of about 6 to 800 and comprising about 75 weight percent copolymerized ethylene and about 25 weight percent copolymerized vinyl ester wherein the acid moiety contains 1 to 4 carbon atoms, (B) about 0.3 to 1.5 weight percent of a 149° F. AMP fully refined paraffin wax, (C) about 21 to 47 weight percent of a mixture of (a) a microcrystalline wax, (b) an aliphatic thermoplastic hydrocarbon resin substantially free of polymerized aromatics prepared from diene and olefin monomers of 5 to 7 carbon atoms and having a softening point of about 155° F.–240° F., (c) a polymer resin derived from the alkylation of aromatic compounds with dicyclopentadiene and having a softening point of about 40° F. to 105° F., and (d) an antioxidant, the weight ratio of (b) to (c) being about 1, and (D) about 50 to 75 weight percent filler.

Also provided according to the present invention are carpets comprised of a primary backing material stitched with closely spaced erect loops of yarn to form a tufted structure, the bottom surface of the tufted structure having, as a secondary scrim and/or tuft bonding backsize adhesive coating, the above composition.

DESCRIPTION OF THE PREFERRED EMBODIMENTS

Hot melt blends containing 30 percent calcium carbonate filler has been used for several years. Such blends, for example, contained 15 percent ethylene/vinyl acetate (EVA) copolymer of 25 percent VA content and 2 melt index, 30 percent calcium carbonate filler, and 55 percent of a formulated resin precursor as follows:

10.2 percent microwax
1.8 percent "polyethylene AC 8" (Allied Chemical Corp.—240° F. melting point polyethylene wax, having an average molecular weight of 3500)
17.2 percent "Piccopale" 100 SF (Pennsylvania Industrial Chemical Corp.'s aliphatic thermoplastic petroleum hydrocarbon resin, softening point 225° F.–235° F., specific gravity 0.97)
25.6 percent "Piccovar" AP 25 (Pennsylvania Industrial Chemical Corp.'s dicyclopentadiene alkylation polymer, softening point 71° F.–83° F., specific gravity 0.97)
0.2 percent antioxidant.

It has been found that for ease in handling in the mill and optimum finishing results the best operating range of viscosity is from 10,000 to 15,000 cps. at 310° F.

In view of the lower cost of finishing tufted carpets with a latex type backsize adhesive, cost reduction in the formulation of hot melt backsize adhesives became very important. Attempts to reduce hot melt costs by the use of lower cost extenders other than filler have met with failure. It is a well-known fact that to lower the cost of any formulation the most effective cost reduction is obtained by replacement of the more costly ingredients with the lowest cost ingredient. In the case of hot melts the filler is the lowest cost ingredient.

However, it was found that by increasing the filler content above 40–45 percent resulted in blends having excessively high viscosities. For example, the viscosity at 310° F. of a 60 percent filled blend containing 10 percent EVA copolymer of 25 percent VA content and 2 melt index and 30 percent of a resin precursor of the same proportions as indicated above is 49,000 cps. On the other hand, it is well known that if this EVA copolymer was replaced with a 19 or 400 melt index EVA coploymer at the 30 percent filler loading, the blend viscosity would be lowered so far that poor scrim bonds and excessive strike-through of the blend would occur. Furthermore, due to the lower molecular weight of these latter copolymers, it was expected that their use in order to lower the viscosity would result in poor blend strength.

Surprisingly it was found that by increasing the filler content to about 50–75 percent and using EVA copolymers of 25 percent VA and 19 or 400 melt index, blends of reduced cost were obtained which when used in backsize carpets, resulted in carpets of unexpectedly improved hand and reduced strike-through, thereby improving the overall appearance of the carpet, while maintaining good strength properties. Slightly changing the ratio of resins in the resin precursor resulted in a further improvement in physical properties of the carpet produced. The lower cost of the higher filler blends permits the production of unitary carpets (carpets with no secondary backing, often embossed for esthetic and non-skid purposes) at reasonable cost. The blends permit the use of the main blend alone or in conjunction with a precoat (latex base or hot melt) as a based coating for subsequent application of jute or synthetic scrims or latex, vinyl on hot-melt foams. In addition, previous formulations also required the preparation of a precoat in the mill by adding 4 percent of the 2 melt index EVA copolymer to the main blend resin precursor. With the new higher filler blend it was found that the resin precursor can be used directly as a precoat eliminating a mixing step in the mill resulting in lower operating and equipment costs.

The ethylene copolymers discovered to be most useful in the present invention are ethylene copolymers with vinyl esters of lower carboxylic acids. Such ethylene/lower vinyl ester copolymers can be prepared by known techniques, such as illustrated in U.S. Pat. 2,200,429 to Perrin et al. and U.S. Pat. 2,703,794 to Roedel. While an ethylene/vinyl acetate copolymer is preferred, other ethylene copolymers, such as those of vinyl formate, vinyl propionate, and vinyl butyrate, are useful as well. The ethylene copolymers have melt indexes, as measured by ASTM 1238–52T, of about 6–800, preferably about 20 to 400, with polymerized ethylene content of about 75 weight percent. Correspondingly, the polymerized ester content of useful ethylene copolymers is about 25 weight percent. Additionally, ethylene copolymers containing minor amounts (i.e., up to about 3 weight percent) of polymerizable comonomers, such as acrylic acid, methacrylic acid, itaconic acid, acrylamide, beta dimethylaminoethyl methacrylate, beta hydroxyethyl acrylate, diallyl maleate, diallyl phthalate, diallyl ether ether or ethylene glycol dimethcrylate, are useful as well.

Regarding the wax component, it is necessary that it have a melting point sufficiently high to give adhesive compositions with a softening point of greater than about 200° F. Accordingly, the wax component can be either solely a Fischer-Tropsch wax or blends of high melting point petroleum waxes and low molecular eight polyolefin waxes wherein the polyolefin wax is at least 15 weight percent of the wax blend. The preferred high melting point petroleum waxes are those customarily known as microcrystalline waxes which have melting points in excess of about 160° F. or paraffin waxes having melting points in excess of 140° F. Preferred low molecular weight polyolefin waxes are polyethylene waxes having a molecular weight of less than about 5,000 and melting points of 220° F.–250° F.

Additionally the resin precursor contains a base resin and a modifying resin. It has been discovered that the use of this blend in an ethylene copolymer-wax composition produces an adhesive backsizing composition with extraordinarily high toughness. Useful base resins are aliphatic thermoplastic petroleum hydrocarbon resins such as described in Canadian Pat. 531,202 issued Oct. 2, 1956 to Ward. As therein set forth, the resins are prepared from reactive olefins and diene monomers having low carbon atom content (5–7 carbon atoms), and are substantially free of polymerized aromatics. Of the resins therein described, those having molecular weights of about 800–1750, iodine numbers of about 40–66, and ring and ball softening points (ASTM D–32–26) of about 155° F.–240° F., and especially above 215° F., are preferred.

Such useful base resins are available under Pennsylvania Industrial Chemical Corporation's trade name "Piccopale."

Modifying resins useful in the present invention are low molecular weight dicyclopentadiene alkylation polymers having ring and ball softening points of about 40° F.–105° F. Dicyclopentadiene alkylation polymers are described in U.S. Pat. 3,023,200 issued Feb. 27, 1962 to Epstein and Gangemi. As therein defined, the term "alkylation refers to the formation of a carbon to carbon bond between an aromatic nucleus and a dicyclopentadiene nucleus. Also, this patent describes how dicyclopentadiene alkylation polymers can be prepared with desired softening points and molecular weights. Particularly useful modifying resins have specific gravities of about 0.90–1.1, melt viscosities of about 1 poise over the temperature range of about 175° F.–265° F., and softening points of about 65° F.–90° F.

The use of an antioxidant and/or pigments, plasticizers may also be desired.

To attain superior toughness, the weight ratio of base resin to modifying resin is about 1. At higher ratios the resulting adhesive composition is too brittle for use in carpeting applications. On the other hand, the use of lower weight ratios results in adhesive blends that are excessively soft.

The proportional amounts of the ethylene copolymer and precursor resin in the adhesive composition is important. In general, the ethylene copolymer is present in an amount of about 3–15 weight percent, based on the total weight of the filled blend. At lower copolymer contents, the adhesion and toughness characteristics of the blend are diminished while at higher copolymer contents the viscosity of the blend at application temperatures becomes too high. Correspondingly, the precursor resin content is generally from about 21–47 weight percent. The use of lower proportions of this ingredient tends to increase melt viscosity at application temperatures, while higher amounts diminish the adhesive's toughness.

Suitable fillers useful in the present composition are well known; examples of which include clay, talc, calcium, and magnesium silicates, calcium carbonate, wood flour, hydrated alumina, etc. Filler content ranges from about 50 percent to about 75 percent by weight, based on the total composition, while amounts between about 52 and 60 percent are generally considered most preferable.

The particular manner in which the ingredients are added to formulate the composition of the present invention is not critical and can be accomplished by any of the well known techniques. In general, the wax is initially melted, usually in the presence of an antioxidant, and thereafter the resin extenders are uniformly blended in. Subsequently, the ethylene copolymer, generally in a solid form, such as pellets, and filler are blended into the wax/resin mixture.

The following examples, wherein all parts and percentages are by weight, except where otherwise specified further illustrate the advantages of the present invention.

EXAMPLES 1–4

Blend No. 1 containing 45 percent filler was prepared using 12.6 percent EVA copolymer (25 percent VA, melt index 19), 1.4 percent of a 149° F. AMP melt point fully refined paraffin wax and 41 percent of a precursor resin of following composition:

|  | Percent |
|---|---|
| "Polyethylene AC8" | 4.0 |
| Microcrystalline wax | 17.4 |
| "Piccopale" 100 SF | [1] 39.15 |
| "Piccovar" AP 25 | [1] 39.15 |
| Antioxidant | 0.3 |

[1] 50/50 ratio.

This blend had a viscosity of 6500 cps. at 310° F. It did not produce satisfactory carpet due mainly to the low blend viscosity.

Two lower cost higher filled blends containing the 25 percent VA, 19 melt index EVA copolymer and 52 percent and 60 percent filler have been prepared (Blend No. 2 and 3, respectively). Another blend containing a 25 percent VA, 400 melt index EVA copolymer and 75 percent filler, Blend No. 4, has also been prepared. The physical properties of the blends are summarized in Table III and compositions are given in Tables I and II. Physical properties of the carpet finished with the 30, 52, 60 and 75 percent blends and having a jute primary backing are shown in Table V.

The 60 percent and 75 percent filled blends before the filler is added have a low enough viscosity to permit their shipment as a liquid. This would reduce blending costs in the mill since only the filler need be added and equipment costs would be reduced since no storage facilities would be needed for the EVA copolymer pellets. The viscosity of the 75 percent filler blend without the filler is given at different temperatures in Table VI.

The precursor used in the 30 percent filled blend was used in initial experiments during development of the higher (60 percent) filler content blends. It was found that the resistance to pilling of the finished carpet was poor (Table IV). To overcome this the ratio of "Piccopale" 100 SF to "Piccovar" AP 25 in the precursor was changed from 40/60 to 50/50. This change produced a stiffer blend which improved the pill resistance of the carpet. Thus a special additive blend was prepared which when added to a blend having a 50/50 ratio of 100 SF/AP 25 would produce an even stiffer (60/40, 100 SF/AP 25 ratio) blend. The addition of 26 pounds of the following blend to 100 pounds of the 50/50 ratio precursor will produce a 60/40 ratio precursor blend:

|  | Percent |
|---|---|
| "Polyethylene AC8" | 4.3 |
| Microcrystalline wax | 18.1 |
| "Piccopale" 100 SF | 77.2 |
| Antioxidant | 0.4 |

This material can be supplied as a flake or liquid. The liquid has a viscosity of 280 cps. at 310° F.

Pill resistance of the finished carpet was determined by the wire brush method as described in Table IV, and by the random tumble pill test. For the purposes of this latter test, "pills" are defined as bunches or balls of tangled fiber ends which are held to the surface of a carpet by one or more fibers. "Cable pills" are entangled fibers which cannot be untangled by passing a pick through the tangled area. Bunches or balls of fibers are not present in cable pills.

The tumble pill tester consists of a Norge home dryer, Model AE-620, modified by: replacing the timer switch with an on-off switch, using a Lucite® door to retain the specimen in the drum, using stainless steel reinforcement for the basket liner and providing for a positive exhaust system.

The tester is loaded with the following materials:

(1) Thirty gum rubber sheets, 18½" x 5¾" x 3/32" of durometer hardness 40±5 weighing approximately 12 lbs.

(1) Five Neoprene sheets. Acme #2615, 17¾" x 5¾" x ⅛" of durometer hardness 55±5. The sheets are to be punched with 24 1" diameter holes forming eight rows of three holes each. The total weight of the sheets should be approximately 2.8 lbs.

(3) Six fabric balls, approximately 5" diameter, ½ lb. each, made of cotton rag wrapped with 80 x 80 cotton print cloth and held by masking tape. Print cloth is supplied by Test Fabrics, Inc., 55 Vandam St., New York 13, N.Y., catalog No. 400.

(5) A minimum of twelve or a maximum of eighteen carpet specimens. The specimens are prepared by cutting three 8" x 8" squares from each carpet sample, selected from the two sides and center of the sample. Two specimens are then stapled back-to-back with a polyethylene stiffener (6¼" x 6¼" x ⅛" 45 mils low density polyethylene sheet, Franklin Fiber-Lamtex Corp., Wilmington, Del.) between them. The carpet specimens are conditioned at 75±2° F. and 50±5% R.H. in moving air for a minimum of 16 hours prior to testing.

The tester is started and the exhaust blower is turned on. At the end of 10 hours of tumbling, the specimens are removed from the tester and the staples holding the specimens to the stiffener are removed. The specimens are vacuumed lightly and the loose edges are trimmed.

The specimens are rated for pilling against the reference standards that the specimens most nearly resemble in color. Carpet pilling standards for cut and loop pile carpets are prepared with the following rating bases:

5—no pilling
4—slight pilling
3—moderate pilling
2—considerable pilling
1—severe pilling

TABLE I

| | Viscosity, cps. | | | | |
|---|---|---|---|---|---|
| | Precursor resin of Blend No. 1 | Percent filler | | | |
| | | 30% filler | 52% Blend No. 2 | 60% Blend No. 3 | 75% Blend No. 4 |
| Blend temp. ° F.: | | | | | |
| 350 | 28 | 5,680 | 5,300 | 4,925 | 7,000 |
| 330 | 37 | 8,200 | 7,400 | 7,175 | |
| 310 | 53 | 11,800 | 10,850 | 10,425 | 12,625 |
| 290 | 72 | 17,440 | 16,125 | 15,670 | |
| 270 | 110 | 24,680 | 25,500 | 24,100 | |
| 250 | 178 | 35,200 | 42,100 | 39,200 | 43,250 |
| Composition, percent: | | | | | |
| EVA copolymer [1] | | 15.0 | | | |
| EVA copolymer [2] | | | 10.8 | 8.1 | |
| EVA copolymer [3] | | | | | 3.6 |
| 149° F. AMP melt point fully refined paraffin wax | | | 1.2 | 0.9 | 0.4 |
| "Polyethylene AC8" | 4.0 | 1.8 | 1.44 | 1.3 | 0.84 |
| Microcrystalline wax | 17.4 | 10.2 | 6.26 | 5.3 | 3.65 |
| "Piccopale" 100SF | 39.15 | 17.2 | 14.09 | 12.1 | 8.22 |
| "Piccovar" AP25 | 39.15 | 25.6 | 14.09 | 12.1 | 8.22 |
| BHT antioxidant | .3 | 0.2 | 0.12 | 0.2 | 0.07 |
| Filler | | 30.0 | 52.0 | 60.0 | 75.0 |

[1] 25% VA, 2 melt index.
[2] 25% VA, 19 melt index.
[3] 25% VA, 400 melt index.

TABLE II.—BLEND COMPOSITION

| Blend No. | Filler, percent | Precoat composition | Main coat composition |
|---|---|---|---|
| | 30 | 4% EVA copolymer,[3] 96% RB 168 [1] | 15% EVA copolymer,[3] 55% RB 168,[1] 30% filler. |
| 2 | 52 | Precursor resin of Blend No. 1 [2] | 10.8% EVA copolymer,[4] 1.2% 149° F. AMP melt point fully refined paraffin wax, 36% precursor resin of Blend No. 1, 52% filler. |
| 3 | 60 | do | 8.1% EVA copolymer,[4] 0.9% 149° F. AMP melt point fully refined paraffin wax, 31% precursor resin of Blend No. 1, 60% filler. |
| 4 | 75 | do | 3.6% EVA copolymer,[5] 0.4% 149° F. AMP melt point fully refined paraffin wax, 21% precursor resin of Blend No. 1, 75% filler. |

[1] RB 168: 18.5% Shellmax 400, 3.4% AC 8, 31.3% 100 SF, 46.5% AP 25, 0.3% BHT.
[2] Precursor resin of Blend No. 1: 4% AC 8, 17.4% Shellmax 400, 39.15% AP 25, 39.15% 100 SF, 0.3% BHT.
[3] 25% VA, 2 melt index.
[4] 25% VA, 19 melt index.
[5] 25% VA, 400 melt index.

TABLE III

| Blend No. | Filler, percent | Tensile strength. lbs. | Elongation, percent | Elastic modulus | Ring & ball, ° F. | Viscosity, cps. at 310° F. |
|---|---|---|---|---|---|---|
| | 30 | 140.1 | 454.38 | 8.454 | 207 | 11,800 |
| 2 | 52 | 320.2 | 28.88 | 15.702 | 208 | 10,850 |
| 3 | 60 | 379.5 | 17.77 | 20.326 | 212 | 10,425 |
| 4 | 75 | 443.7 | 8.88 | 29.99 | 214 | 12,625 |

TABLE IV

| Ratio 100SF/AP25 | Blend add-on, oz./yd.² | | Pill value | Wire brush value [1] |
|---|---|---|---|---|
| | Precoat | Main coat | | |
| 40/60 | 5.4 | 13.9 | 2.25 | N-M |
| 50/50 | 5.4 | 14.6 | 4.25 | N-M |

[1] Measured by 20 strokes of a wire brush and subjectively compared for fuzz with following ratings: O=no fuzz; N=noticeable fuzz; M=moderate fuzz; A=appreciable fuzz. Fuzz rating of 0, N, or M is acceptable.

TABLE V

| Blend No. | Filler, percent | Blend add-on, oz./yd.² | | Tuft pull, lb. | Scrim bond, lb./3 ins. | Wire brush value |
|---|---|---|---|---|---|---|
| | | Precoat | Main | | | |
| | 30 | 7.9 | 14.0 | 12.0 | 22.6 | Noticeable. |
| 2 | 52 | 5.4 | 16.4 | 12.0 | 17.4 | Moderate. |
| 3 | 60 | 5.7 | 18.4 | 10.5 | 18.1 | Noticeable. |
| 4 | 75 | 6.0 | 23.0 | 11.8 | 12.3 | Do. |

TABLE VI

| Temp., °F. | Viscosity | |
|---|---|---|
| | Cps. | SSU [1] |
| 250 | 610 | 2,780 |
| 270 | 412.5 | 1,880 |
| 290 | 290.0 | 1,320 |
| 310 | 207.5 | 950 |
| 330 | 155.0 | 700 |
| 350 | 117.5 | 535 |

[1] Saybolt Universal Seconds.

I claim:

1. A composition having a softening point of at least about 200° F. comprising
   (A) about 3-15 weight percent ethylene copolymer having a melt index of about 6 to 800 and comprising about 75 weight percent copolymerized ethylene and about 25 weight percent copolymerized vinyl ester wherein the acid moiety contains 1 to 4 carbon atoms,
   (B) about 0.3-1.5 weight percent of a 149° F. AMP fully refined paraffin wax,
   (C) about 21-47 weight percent of a mixture of
       (a) a microcrystalline wax,
       (b) an aliphatic thermoplastic hydrocarbon resin substantially free of polymerized aromatics prepared from diene and olefin monomers of 5 to 7 carbon atoms and having a softening point of about 155° F.-240° F.,
       (c) a polymer resin derived from the alkylation of aromatic compounds with dicyclopentadiene and having a softening point of about 40° F. to 105° F., and
   (d) an antioxidant, the weight ratio of (b) to (c) being about 1, and
   (D) about 50 to 75 weight percent filler.

2. The composition of claim 1 wherein said ethylene copolymer has a melt index of about 20 to 400.

3. The composition of claim 2 wherein resin (b) has a softening point of about 215° F. to 240° F. and resin (c) has a softening point of about 65° F. to 90° F.

4. The composition if claim 2 wherein the vinyl ester is vinyl acetate.

5. The composition of claim 4 wherein the melt index of the ethylene copolymer is about 400.

6. The composition of claim 4 wherein the weight percent of filler (C) is about 52 to 60 percent.

7. A carpet comprised of a primary backing material stitched with closely spaced erect loops of yarn to form a tufted structure, the bottom surface of the tufted structure having, as a tuft bonding backsize adhesive coating the composition of claim 1.

8. The carpet of claim 7 wherein a secondary scrim is bonded with said backsize adhesive coating to the bottom surface of the tufted structure.

9. A carpet comprised of a primary backing material stitched with closely spaced erect loops of yarn to form a tufted structure, the bottom surface of the tufted structure having, as a tuft bonding backsize adhesive coating, the composition of claim 4.

10. The carpet of claim 9 wherein a secondary scrim is bonded with said backsize adhesive coating to the bottom surface of the tufted structure.

11. A carpet comprised of a primary backing material stitched with closely spaced erect loops of yarn to form a tufted structure, the bottom surface of the tufted structure having as a tuft bonding backsize adhesive coating, the composition of claim 5.

References Cited

UNITED STATES PATENTS

| | | | |
|---|---|---|---|
| 3,390,035 | 6/1968 | Sands | 156—72 |
| 3,551,231 | 12/1970 | Smedberg | 156—72 |
| 3,583,936 | 6/1971 | Stahl | 260—887 |
| 3,676,280 | 7/1972 | Sands | 161—67 |
| 3,684,600 | 8/1972 | Smedberg | 156—72 |

WILLIAM J. VAN BALEN, Primary Examiner

U.S. Cl. X.R.

117—161 UZ; 156—72, 334; 161—234, 247; 260—28.5 AV, 887